United States Patent
El-Khatib

(10) Patent No.: US 10,975,211 B2
(45) Date of Patent: Apr. 13, 2021

(54) SEMI-RIGID POLYURETHANE FOAM AND PROCESS TO MAKE

(71) Applicant: Dow Global Technologies LLC, Midland, MI (US)

(72) Inventor: Ali J. El-Khatib, Dearborn, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/089,015

(22) PCT Filed: Mar. 8, 2017

(86) PCT No.: PCT/US2017/021350
§ 371 (c)(1),
(2) Date: Sep. 27, 2018

(87) PCT Pub. No.: WO2017/172312
PCT Pub. Date: Oct. 5, 2017

(65) Prior Publication Data
US 2019/0127542 A1    May 2, 2019

Related U.S. Application Data

(60) Provisional application No. 62/314,508, filed on Mar. 29, 2016.

(51) Int. Cl.
| *C08G 18/48* | (2006.01) |
| *C08J 9/00* | (2006.01) |
| *C08G 18/63* | (2006.01) |
| *C08G 18/76* | (2006.01) |
| *C08G 18/32* | (2006.01) |
| *C08L 75/04* | (2006.01) |
| *C08G 18/42* | (2006.01) |
| *C08G 101/00* | (2006.01) |

(52) U.S. Cl.
CPC .......... *C08J 9/0042* (2013.01); *C08G 18/329* (2013.01); *C08G 18/425* (2013.01); *C08G 18/4244* (2013.01); *C08G 18/4841* (2013.01); *C08G 18/632* (2013.01); *C08G 18/7664* (2013.01); *C08L 75/04* (2013.01); *C08G 2101/0016* (2013.01); *C08G 2101/0083* (2013.01); *C08G 2350/00* (2013.01); *C08J 2375/04* (2013.01)

(58) Field of Classification Search
CPC .......... C08G 18/329; C08G 18/4244; C08G 18/425; C08G 18/4841; C08G 18/632; C08G 18/7664; C08G 2101/0016; C08G 2101/0083; C08G 2350/00; C08J 9/0042; C08J 2375/04; C08L 75/04
See application file for complete search history.

(56) References Cited

U.S. PATENT DOCUMENTS

| | | | |
|---|---|---|---|
| 5,523,332 A | 6/1996 | Fishback et al. | |
| 5,523,333 A | 6/1996 | Fishback et al. | |
| 5,523,334 A | 6/1996 | White, III et al. | |
| 6,423,755 B1 * | 7/2002 | Allen | C08G 18/12 521/111 |
| 6,660,782 B1 | 12/2003 | Matijega | |
| 6,765,034 B2 | 7/2004 | Nishida et al. | |
| 8,299,137 B2 * | 10/2012 | Loh | C08G 18/4883 521/131 |
| 2002/0019452 A1 | 2/2002 | Roels et al. | |
| 2013/0150473 A1 * | 6/2013 | Miyazaki | C08G 18/4072 521/116 |
| 2013/0184368 A1 | 7/2013 | Lazraq et al. | |

FOREIGN PATENT DOCUMENTS

| EP | 0421269 A2 | 4/1991 |
| EP | 0617068 A2 | 9/1994 |
| EP | 708127 A3 | 8/1996 |
| JP | 10316733 | 2/1998 |
| WO | 1994/0025514 | 11/1994 |
| WO | 2011/066095 A1 | 6/2011 |

OTHER PUBLICATIONS

PCT/US2017/021350, International Search Report and Written Opinion dated Jun. 21, 2017.
PCT/US2017/021350, International Preliminary Report on Patentability dated Oct. 2, 2018.

* cited by examiner

*Primary Examiner* — John M Cooney

(57) ABSTRACT

Disclosed is a composition and process for making a water blown semi-rigid polyurethane foam wherein the polyisocyanate side and the polyol side are combined under ambient temperature conditions. Said foams are particularly suited for sound and vibration management, especially in motor vehicles.

6 Claims, No Drawings

SEMI-RIGID POLYURETHANE FOAM AND PROCESS TO MAKE

FIELD OF THE INVENTION

The present invention relates to a composition and process for making semi-rigid polyurethane foam at ambient temperatures. Said foams are particularly suited for sound and vibration management in motor vehicles.

BACKGROUND OF THE INVENTION

Noise and vibration management is a significant issue for vehicle manufacturers, as cabin noise is a major factor in the comfort experience of automotive passengers. Therefore, noise and vibration abatement measures are routinely incorporated into motor vehicles. These abatement measures often utilize polyurethane foams.

Generally, there are two types of polyurethane foams: flexible and rigid. In general, flexible foams have open cellular structures and a flexible polyurethane (e.g., uses a low functionality; high molecular weight polyol) which allows them to be elastically deformed. Generally, when making a flexible polyurethane foam, water in the polyol side is used as the blowing agent. The water reacts with the isocyanate producing carbon dioxide that foams the polyurethane as the isocyanate and polyol react.

For automotive applications requiring stiffening, reinforcing, and/or NVH (noise, vibration and harshness) abatement in a vehicle, rigid polyurethane foam is preferred. Rigid polyurethane foam is based on the polymerization of polyether and/or polyester polyols with isocyanates in the presence of water acting as blowing agent. These systems generally contain additional components such as crosslinkers, chain extenders, surfactants, cell regulators, stabilizers, antioxidants, flame retardant additives, fillers, and typically catalysts such as tertiary amines, and organometallic salts. Levels of the catalysts in the polyurethane formulation are adjusted during the foam manufacturing process to optimize processing as well as final foam properties such as cell structure, density, hardness, resiliency, airflow, elongation, tear resistance, aging, and emission characteristics.

Rigid foams generally have a substantially closed cellular structure which essentially fails to elastically deform (i.e., when a rigid foam deforms, it deforms permanently). To provide rigidity, rigid polyurethane foams, typically, are formed using a lower molecular weight polyol than used to make a flexible foam and also a cross-linking polyol. Generally, the cross-linking polyol has (1) a hydroxyl functionality of greater than 3 to 8 (i.e., typically greater than 3 to 8 hydroxyl groups/molecule that can react with the isocyanate), (2) a mean molecular weight of 300 to 800 and high viscosity of 3000 to 20,000 centipoise. The cross-linking polyols are typically added to increase the cross-linking density to form a rigid foam of adequate strength and rigidity.

Unfortunately, the use of high viscosity cross-linking polyols generally raises the viscosity of the polyol side substantially. The increased viscosity of the polyol side typically makes it difficult to achieve efficient mixing with the low viscosity isocyanate side, especially at ambient temperatures, resulting in inhomogeneous rigid foams. Historically, low viscosity, liquid volatile organic compounds (i.e., added liquid blowing agents such as hydrocarbons and/or halogenated hydrocarbons) have been used to lower the viscosity. However, this results in volatile organic compound (VOC) emissions when making the foam. Alternatively, a process which requires temperature control so that the viscosity of the polyol side is within a workable range is employed. However, such processes add additional cost and complexity to producing the polyurethane foam see WO 2011/066095.

It would be desirable to provide a composition for producing polyurethane foam which processes at ambient temperatures useful for applications requiring stiffening, reinforcing, and/or noise, vibration and harshness abatement.

BRIEF SUMMARY OF THE INVENTION

The present invention is such a composition and process to form a semi-rigid polyurethane foam useful for applications requiring stiffening, reinforcing, and/or noise, vibration and harshness abatement, comprising the reaction product of: (a) an A-side comprising (i) from 65 to 85 wt % of a polymeric MDI blend, preferably with NCO rage of 18 to 25%, (ii) from 10 to 35 wt % of a plasticizer, (iii) from 0.2 to 1.5 wt % of a first A-side surfactant, preferably an organosilicone surfactant, and optionally (iv) from 0.2 to 1.5 wt % of a second surfactant different from the first surfactant, preferably an organosilicone surfactant, wherein the A-side weight percents are based on the total weight of the A-side, and (b) a B-side comprising: (i) from 10 to 40 wt % of a copolymer polyol containing at least 40% solids, (ii) from 10 to 40 wt % of a polyether polyol having a functionality equal to or greater than 3, (iii) from 10 to 25 wt % of a autocatalytic aromatic polyol, (iv) from to 6 wt % of a tertiary amine catalyst, (v) from 0.5 to 2 wt % of a first B-side surfactant, (vi) from 5 to 15 wt % water, and optionally (vii) a crosslinker, preferably from 2 to 6 wt %, wherein the B-side weight percents are based on the total weight of the B-side, said process comprising the steps of: (A) forming a reactive blend by mixing said A-side and said B-side at 125° F. or lower, preferably at ambient temperature, preferably in a ratio, (A-side):(B-side) of 1:1 to 5:1 by volume; and (B) subjecting the resulting reactive blend to conditions sufficient to cure the reactive blend to form a semi-rigid polyurethane foam.

In one embodiment of the present invention, foam composition made by the process disclosed herein above is used in an automobile noise and vibration-absorbing application.

DETAILED SUMMARY OF THE INVENTION

The process according to the present invention contacts (a) an A-side comprising, consisting essentially of, or consisting of a (i) an organic isocyanate, preferably MDI; (ii) a plasticizer; and (iii) a surfactant with (b) a B-side comprising, consisting essentially of, or consisting of a polyol blend comprising, consisting essentially of, or consisting of (i) a copolymer polyol, (ii) a tertiary polyether polyol, and (iii) autocatalytic polyol; (iv) a tertiary amine catalyst; (v) at least one surfactant; (vi) water, and optionally (vii) a crosslinker. The A-side is mixed, preferably at ambient temperature, with the B-side to form (c) a reactive blend. The resulting reactive blend is subjected to conditions sufficient to cure the reactive blend to form a semi-rigid polyurethane foam.

The semi-rigid polyurethane foam of the present invention is a substantially rigid foam generally having a substantially closed cellular structure which essentially fails to elastically deform (i.e., any deformation of the foam tends to be permanent). These materials do not in general have the capability of resisting permanent deformation after repeated compressions in excess of 50%. Such resistance to permanent deformation of deformation set has not been a feature of polyurethane foam materials, but for most purposes, where the material is not subjected to repeated compression, this has posed no problem. Semi-rigid foams have more rigid character and do not recover 100% after deformation. Typically these foam systems have a high capacity for energy absorption application area include side impact, head impact and bumpers. Cross-linker and copolymer polyol levels are generally increased to maximize foam hardness and energy dissipation characteristics.

Suitable organic isocyanates (a)(i) for use in the composition and process of the present invention include any of those known in the art for the preparation of polyurethane foams, like aliphatic, cycloaliphatic, araliphatic and, preferably, aromatic isocyanates, such as toluene diisocyanate in the form of its 2,4 and 2,6-isomers and mixtures thereof (TDI) and diphenylmethane diisocyanate in the form of its 2,4'-, 2,2'- and 4,4'-isomers and mixtures thereof, the mixtures of diphenylmethane diisocyanates (MDI) and oligomers thereof having an isocyanate functionality greater than 2 known in the art as "crude" or polymeric MDI (polymethylene polyphenylene polyisocyanates), the known variants of MDI comprising urethane, allophanate, urea, biuret, carbodiimide, uretonimine and/or isocyanurate groups.

Preferably the NCO value for the MDI is equal to or greater than 10 percent, preferably equal to or greater than 15 percent, and more preferably equal to or greater than 18 percent. Preferably the NCO value for the MDI is equal to or less than 33 percent, preferably equal to or less than 29 percent, more preferably equal to or less than 18 percent.

Preferably monomeric MDI, crude MDI, polymeric MDI, combinations thereof, and/or liquid variants thereof are obtained by introducing uretonimine and/or carbodiimide groups into said polyisocyanates, such a carbodiimide and/or uretonimine modified polyisocyanate having an NCO value of from 18 to 25 percent and includes 1 to 45 percent by weight of 2,4'-diphenylmethane diisocyanate in the form of a monomer and/or a carbodiimidization product thereof. For a good description of such carbodiimide and/or uretonimine modified polyisocyanates see U.S. Pat. No. 6,765,034, which is incorporated by reference herein in its entirety.

In the present invention, the organic isocyanate component may include one or more organic polyisocyanate, in addition to and/or in place of monomeric MDI as needed, provided other polyisocyanate compounds do not have adverse influences on the performance on the desired sound deadening properties of the semi-rigid polyurethane foam. Typical examples of such other polyisocyanate compounds include isocyanate-terminal prepolymers which are formed by a reaction between at least one of compounds of the above-indicated monomeric MDI, and suitable active hydrogen compounds. To improve the formability and other characteristics of the obtained foam, the other polyisocyanate compounds may be selected from among organic isocyanates such as tolylene diisocyanate (TDI), isopholone diisocyanate (IPDI) and xylene diisocyanates (XDI), and modifications thereof. These isocyanates may be used in combinations of two or more types. Most preferably polyisocyanates are used which have an average isocyanate functionality of 2.1 to 3.0 and preferably of 2.2 to 2.8.

The MDI (a)(i) is present in the A-side in an amount of equal to or greater than 55 weight percent, preferably equal to or greater than 60 weight percent, and more preferably equal to or greater than 65 weight percent, based on the total weight of the A-side. The MDI is present in the A-side in an amount of equal to or less than 95 weight percent, preferably equal to or less than 90 weight percent, and more preferably equal to or less than 85 weight percent, based on the total weight of the A-side.

The A-side comprises at least one plasticizer (a)(ii). Suitable plasticizers are various carboxylic ester compounds such as bis (2-ethylhexyl) phthalate, diisononyl phthalate, bis(n-butyl) phthalate, butyl benzyl phthalate, diisodecyl phthalate, diethyl phthalate, diisobutyl phthalate, di-n-hexyl phthalate, trimethyl trimellitate, tri-(2-ethylhexyl) trimellitate, tri-(n-octyl,n-decyl) trimellitate, tri-(heptyl,nonyl) trimellitate, n-octyl trimellitate, bis(2-ethylhexyl)adipate, dimethyl adipate, monomethyl adipate, dioctyl adipate, dibutyl sebacate, dibutyl maleate, diisobutyl maleate, various benzoate esters, various vegetable oils and modified vegetable oils (such as epoxidized vegetable oils, various sulfonamides such as n-ethyl toluene sulfonamide, n-(2-hydroxypropyl) benzene sulfonamide, N-(n-butyl)benzene sulfonamide (DOA) and the like, various phosphate esters such as tricresyl phosphate and tributyl phosphate, glycol esters such as triethylene glycol dihexanoate and tetraethylene glycol diheptanoate and the like, polybutene polymers, various acetylated monoglycerides, alkyl citrates such as triethyl citrate, acetyl triethyl citrate, tributyl citrate, trioctyl citrate, acetyl trioctyl citrate, acetyl trihexyl citrate, butyryl trihexyl citrate and the like; alkyl sulphonic acid phenyl ester, 1,2-cyclohexane dicarboxylate diesters such as 1,2-cyclohexane diisononyl ester, and the like.

The plasticizer (a)(ii) is present in the A-side in an amount of equal to or greater than 10 weight percent, preferably equal to or greater than 12 weight percent, and more preferably equal to or greater than 15 weight percent, based on the total weight of the A-side. The plasticizer is present in the A-side in an amount of equal to or less than 35 weight percent, preferably equal to or less than 30 weight percent, and more preferably equal to or less than 25 weight percent, based on the total weight of the A-side.

The A-side comprises at least one surfactant (a)(iii). A surfactant is preferably included in the foam formulation to help stabilize the foam as it expands and cures. Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids can also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as TEGOSTAB™ B-8729, B-8404, B-8870, and B-8719LF available from Goldschmidt Chemical Corp., DABCO™ DC-198 available from Air Products, and NIAX™ L2171 surfactant from Momentive Performance Materials. Non-hydrolyzable liquid organosilicones are more preferred. The surfactant is typically present in an amount equal to or greater than 0.1 weight percent, preferably equal to or greater than 0.2 weight percent, and more preferably equal to or greater than 0.5 weight percent based on the total weight of the A-side. The surfactant is typically present in an amount equal to or less than 2 weight percent, preferably equal to or less than 1.5 weight percent, and more preferably equal to or less than 1 weight percent based on the total weight of the A-side.

The B-side comprises a polyol blend comprising (b)(i) a copolymer polyol, (b)(ii) a tertiary polyether polyol, and (b)(iii) an autocatalytic aromatic polyol. Modified polyols, often referred to as "copolymer polyols" have been fully described in the prior art and include products obtained by the in situ polymerization of one or more vinyl monomers, for example styrene and acrylonitrile, in polymeric polyols, for example polyether polyols, or by the in situ reaction between a polyisocyanate and an amino- or hydroxy-functional compound, such as triethanolamine, in a polymeric polyol.

The polymer modified polyols which are particularly interesting in accordance with the invention are products obtained by in situ polymerization of styrene and/or acrylonitrile in polyoxyethylene polyoxypropylene polyols and products obtained by in situ reaction between a polyisocyanate and an amino or hydroxy-functional compound (such as triethanolamine) in a polyoxyethylene polyoxypropylene polyol.

Polyoxyalkylene polyols containing from 5 to 50 percent of dispersed polymer are particularly useful. Particle sizes of the dispersed polymer of less than 50 microns are preferred. Mixtures of such isocyanate-reactive components may be used as well. Most preferably polyols are used which do not comprise primary, secondary or tertiary nitrogen atoms.

The copolymer polyol is typically present in the B-side an amount equal to or greater than 5 weight percent, preferably equal to or greater than 10 weight percent, and more preferably equal to or greater than 15 weight percent based on the total weight of the B-side. The copolymer polyol is typically present in the B-side an amount equal to or less than 50 weight percent, preferably equal to or less than 40 weight percent, and more preferably equal to or less than 30 weight percent based on the total weight of the B-side.

The polyol blend comprises a polyether polyol (b)(ii). Suitable polyether polyols have been fully described in the prior art and include reaction products of alkylene oxides, for example ethylene oxide and/or propylene oxide, with initiators having a functionality of from 2 to 8, preferably 3 to 8, and an average hydroxyl number preferably from about 100 to 850, more preferably from about 200 to 750, and more preferably 200 to 650. Of particular importance for the preparation of the semi-rigid polyurethane foams of the present invention are polyether polyols and polyol mixtures having a functionality equal to or greater than 3 and equal to and less than 8. The polyol or polyols may have a viscosity at 25° C. of at least about 500 cP, as measured according to ASTM D455. In some embodiments, a higher viscosity, of at least about 2,000 cP, may be preferable. Preferably, the polyol or polyols have an average molecular weight of from 100 to 10,000, more preferably of from 200 to 5,000.

Suitable initiators for the present invention include: polyols, for example ethylene glycol, diethylene glycol, propylene glycol, dipropylene glycol, butane diol, glycerol, trimethylolpropane, triethanolamine, pentaerythritol, sorbitol and sucrose; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with polycarboxylic acids. Still further suitable polyols include hydroxyl terminated polythioethers, polyamides, polyesteramides, polycarbonates, polyacetals, polyolefins and polysiloxanes. Still further suitable isocyanate-reactive components include ethylene glycol, diethylene glycol, propylene glycol, dipropylene glycol, butane diol, glycerol, trimethylolpropane, ethylene diamine, ethanolamine, diethanolamine, triethanolamine and the other initiators mentioned before. Mixtures of such isocyanate-reactive components may be used as well. Most preferably polyols are used which do not comprise primary, secondary or tertiary nitrogen atoms.

Of particular importance for the preparation of the semi-rigid polyurethane foams of the present invention are polyether polyols and polyol mixtures having a hydroxyl number of equal to or greater than 50, preferably equal to or greater than 80, more preferably equal to or greater than 100. Hydroxyl number indicates the number of reactive hydroxyl groups available for reaction. It is expressed as a number of milligrams of potassium hydroxide equivalent to the hydroxyl content of one gram of polyol. Of particular importance for the preparation of the semi-rigid isocyanate-based polymer foams of the present invention are polyols and polyol mixtures having hydroxyl number of equal to or less than 1,200, preferably equal to or less than 1,000, more preferably equal to or less than 800.

Of particular importance for the preparation of the semi-rigid foams are reaction products of alkylene oxides, for example ethylene oxide and/or propylene oxide, with initiators containing from 2 to 8, preferably 3 to 8 active hydrogen atoms per molecule. Suitable initiators include: polyols, for example ethylene glycol, diethylene glycol, propylene glycol, dipropylene glycol, butane diol, glycerol, trimethylolpropane, triethanolamine, pentaerythritol and sorbitol; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with polycarboxylic acids. Still further suitable polyols include hydroxyl terminatedpolythioethers, polyamides, polyesteramides, polycarbonates, polyacetals, polyolefins and polysiloxanes. Preferred polyols are the polyether polyols comprising ethylene oxide and/or propylene oxide units and most preferably polyoxyethylene polyoxypropylene polyols having an oxyethylene content of at least 10 percent and preferably 10 to 85 percent by weight. A preferred isocyanate-reactive component comprises an ethylene-oxide capped polyether polyol.

The polyol blend further comprises (b)(iii) an autocatalytic polyol compound. The autocatalytic polyol compound is a polyol containing at least one tertiary amine group having a functionality of 1 to 8, preferably 2 to 8, more preferably 2 to 6, and a hydroxyl number of from 15 to 200. Aromatic amine based polyether polyols which may be used in the invention include those made from an aromatic amine reacted with one or more alkylene oxides. Useful aromatic amine based polyether polyols include those based on 1,2-, 1,3- and 1,4-phenylenediamine; 2,3-, 2,4-, 3,4- and 2,6-toluene diamine (TDA); 4,4'-, 2,4'- and 2,2'-diaminodiphenylmethane (DADPM); and/or polyphenyl-polymethylene-polyamine initiators. The alkoxylated aromatic amine polyols may contain alkoxylation products derived from other ingredients in the initiator mixture. In most cases they contain alkoxylation products of lower molecular weight diols and triols such as diethylene glycol, glycerine and/or water. In addition, the aromatic amine based polyether polyol may contain lower molecular weight diols and triols such as diethylene glycol, dipropylene glycol and/or glycerine. Aromatic amine based polyether polyols such as TDA-based polyether polyols and diaminodiphenylmethane or polymethylene polyphenylene polyamine (DADPM)-based polyether polyols have been described as suitable isocyanate-reactive compounds for rigid polyurethane foams (see, for example, EP 421269; 617068, and 708127; WO 94/25514, and U.S. Pat. Nos. 5,523,333; 5,523,332; and 5,523,334)

TDA-based polyether polyols for use in the present invention generally have OH numbers in the range of about 350 to about 810, preferably about 350 to about 470 mg KOH/g, more preferably about 350 to about 430 mg KOH/g and have functionalities in the range of about 3.7 to about 4.0, preferably about 3.9. The molecular weight is generally between about 280 to about 640 g/mol. TDA-based polyether polyols having this range of functionalities and OH values are well known in the art. TDA-based polyether polyols which may be used in the present invention are obtained by the addition of alkylene oxides, such as ethylene oxide and/or propylene oxide to one or more of the various isomers of toluene diamine such as 2,4-, 2,6-, 2,3- and 3,4-TDA. Preferably 2,3- and/or 3,4-TDA (ortho-TDA or vicinal TDA) is used as initiator with up to 25 wt % of total initiator of meta-TDA (2,4- and/or 2,6-TDA). Vicinal TDA is a pure isomer or mixture thereof, preferably containing about 20 to about 80 wt % 2,3-TDA and about 80 to about 20 wt % 3,4-TDA. Other co-initiators can be used additionally in an amount up to about 60% by weight of total initiator, preferably between about 5 and about 10% by weight.

The autocatalytic polyol compound (b)(iii) is present in the B-side in an amount equal; to or greater than 5 weight percent, preferably equal to or greater than 10 weight percent, and more preferably equal to or greater than 12 weight percent based on the total weight of the B-side. The autocatalytic polyol compound (b)(iii) is present in the B-side in an amount equal; to or less than 30 weight percent, preferably equal to or less than 25 weight percent, and more preferably equal to or less than 20 weight percent based on the total weight of the B-side.

The B-side comprises at least one tertiary amine catalyst (b)(iv), which may be selected from any effective tertiary amine. Such selections such may typically include the N-alkylmorpholines, N-alkylalkanolamines, aminoalcohols, N,N-dialkylcyclohexylamines, alkylamines where the alkyl groups are methyl, ethyl, propyl, butyl and isomeric forms thereof, and heterocyclic amines. Non-limiting specific examples thereof include 1-methylimidazole, triethylenediamine, tetramethylethylenediamine, bis(2-dimethyl-aminoethyl)ether, triethanolamine, triethylamine, tripropylamine, triisoprpylamine, tributylamine, triamylamine, pyridine, quinoline, dimethylpiperazine, N,N-dimethylcyclohexylamine, N-ethyl-morpholine, methyltriethylene-diamine, N,N',N"-tris(dimethylaminopropyl)-sym-hexahydrotriazine, and combinations thereof. A preferred group of tertiary amines comprises 1-methyl-imidazole, 2-ethyl-4-methyl-imidazole, 2-ethylbutyldiisopropylamine, triethylenediamine, triethylamine, triisopropylamine, and combinations thereof.

The tertiary amine catalyst may be any compound possessing catalytic activity for the reaction between a polyol and an organic polyisocyanate and at least one tertiary amine group. Representative tertiary amine catalysts include trimethylamine, triethylamine, dimethylethanolamine, N-methylmorpholine, N-ethylmorpholine, N,N-dimethyl-benzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl) ether, bis(2-dimethylaminoethyl) ether, morpholine,4,4'-(oxydi-2,1-ethanediyebis), triethylenediamine, pentamethyl diethylene triamine, dimethyl cyclohexyl amine, N-acetyl N,N-dimethyl amine, N-coco-morpholine, N,N-dimethyl aminomethyl N-methyl ethanol amine, N, N, N'-trimethyl-N'-hydroxyethyl bis(aminoethyl) ether, N,N-bis(3-dimethylaminopropyl)N-isopropanolamine, (N,N-dimethyl) aminoethoxy ethanol, N, N, N', N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine.

Catalysts are typically used in an amount of 1 to 10 weight percent, preferably from 2 to 6 weight percent based on the total weight of the B-Side.

Optionally, the B-side comprises a crosslinker (b)(v), which preferably is used, in an amount of from 2 weight percent up to 6 weight percent based on the total weight of the B-side. The crosslinker contains at least three isocyanate-reactive groups per molecule and has an equivalent weight, per isocyanate-reactive group, of from 30 to about 125 and preferably from 30 to 75 Aminoalcohols such as monoethanolamine, diethanolamine and triethanolamine are preferred types, although compounds such as glycerine, trimethylolpropane and pentaerythritol also can be used.

The B-side comprises at least one surfactant (b)(v) and can be selected from one or more of the surfactants described herein above. The B-side surfactant (b)(v) may be the same as, or different from, the one or more A-side surfactant (a)(iii). The surfactant is typically present in an amount equal to or greater than 0.1 weight percent, preferably equal to or greater than 0.2 weight percent, and more preferably equal to or greater than 0.5 weight percent based on the total weight of the B-side. The surfactant is typically present in an amount equal to or less than 2 weight percent, preferably equal to or less than 1.5 weight percent, and more preferably equal to or less than 1 weight percent based on the total weight of the B-side.

The B-side further comprises water (b)(vii) as a blowing agent, preferably in an amount of from 5 to 15 weight percent based on the weight of the B-side.

The A-side and/or the B-side may have one or more additional types of other materials, as may be useful in the particular manufacturing process that is used or to impart desired characteristics to the resulting foam. These include, for example, catalysts, blowing agents, cell openers, surfactants, crosslinkers, chain extenders, fillers, colorants, fire retardants, pigments, antistatic agents, reinforcing fibers, antioxidants, preservatives, acid scavengers, and the like. The semi-rigid polyurethane foam formulation may contain one or more other catalysts, in addition to the tertiary amine catalyst mentioned before. Of particular interest among these are tin carboxylates and tetravalent tin compounds. Examples of these include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

Catalysts are typically used in small amounts. For example, the total amount of catalyst used may be 0.0015 to 5 weight %, preferably from 0.01 to 1 weight % based on the total weight of the B-side. Organometallic catalysts are typically used in amounts towards the low end of these ranges.

To manufacture the semi-rigid isocyanate-based polymer foam of the present invention, a reactive formulation is prepared, said reactive formulation comprising: an A-side comprising a (a)(i) an organic isocyanate, preferably MDI; (a)(ii) a plasticizer; (a)(iii) at least one surfactant, and optionally (a)(iv) one or more additional component selected from a catalyst, a cell opener, a crosslinker, a chain extender, a flame retardant, a filler, a colorant, a pigment, an antistatic agent, reinforcing fibers, an antioxidant, a preservative, and/or an acid scavenger. The B-side, comprises a polyol blend comprising (b)(i) a copolymer polyol, (b)(ii) a polyether polyol with a functionality equal to or greater than 3, and (b)(iii) an autocatalytic polyol; and (b)(iv) a tertiary amine catalyst; (b)(v) at least one surfactant; (vi) water, and optionally (b)(vii) one or more additional component selected from a catalyst, a cell opener, a crosslinker, a chain extender, a flame retardant, a filler, a colorant, a pigment, an antistatic agent, reinforcing fibers, an antioxidant, a preservative, and/or an acid scavenger. Preferably, the A-side and B-side are mixed together at 130° F. or lower, preferably ambient temperature (70° F. to 120° F.) at the desired ratio, forming the reactive formulation which, when mixed, allows for the foaming reaction to occur. Preferably the A-side:B-side ratio is 1:1 to 5:1, more preferably 2:1 by volume. The polyol premix (B-side) and the organic polyisocyanate component (A-side) are mixed together by any known urethane foaming equipment. The resulting reactive formulation is subjected to conditions sufficient to cure the reactive formulation to form a semi-rigid isocyanate-based polymer foam The polyol premix (B-side) and the organic polyisocyanate component (A-side) are mixed together by any known urethane foaming equipment. The resulting reactive formulation is subjected to conditions sufficient to cure the reactive formulation to form a semi-rigid polyurethane foam.

The semi-rigid isocyanate-based polymer foam of the present invention can be suitably used to insulate a surface or an enclosure by applying to the surface or enclosure directly or by applying an insulating panel comprising the present foam. Such applications include any insulating surfaces or enclosures such as houses, roofing, buildings, refrigerators, freezers, polyurethane foam of the present invention may be formed into a plurality of discrete foamed particles for conventional loose-fill cushioning and packaging applications, or may be ground into scrap for use as blown insulation.

The method and semi-rigid polyurethane foams produced according to the present invention may be used in any suitable application, such as those known in the art, including applications involving, for example, automotive applications requiring stiffening, reinforcing, NVH (noise, vibration and harshness) abatement in a vehicle.

Examples

Comparative Examples A and B and Examples 1 to 3 comprise a formulated polyol blend reacted with a polymeric MDI. The polymeric MDI has an isocyanate content of about 30.4% by weight. The polyol blend and polymeric MDI are mixed in a polyurethane dispense machine. This dispense machine is a standard machine that is available in the market for example from equipment Suppliers like Graco and Cannon.

The dispense machine is capable of mixing the system at the given ratio. The ratio is controlled by the pump/motor size. This dispense temperature of the material is in the range of 100 to 130° F. and preferred at 115° F. for both sides. The dispense pressure at 115° F. material temperature; the pressure is in the range of 500-750 psi. Material dispense flow rate is in the range of 65-95 g/s at the mix-head.

The isocyanate:polyol mixing ratio by volume for each Examples 1 to 3 and Comparative Examples A and B are listed in Table 1.

For Comparative Example A and B and Examples 1 to 3 formulated A-side (comprising isocyanate and other additives) and B-side (polyol blend comprising polyols and other additives) is made from the following components. Amounts are given as weight % based on the total weight of the A-side or B-side, respectively. In Table 1:

"Polyol-1" is a diethylene glycol-phthalic anhydride-based polyester polyol with an equivalent weight of 1954 available as STEPANOL™ CP 3152 Polyol from Stephan Company;

"Polyol-2" is a nominal 425 Mw homopolymer diol with a OH number of 265 mg KOH/g available as VORANOL 220-260 Polyol from The Dow Chemical Company;

"Polyol-3" is a grafted polyether polyol containing 40 wt % copolymerized styrene and acrylonitrile solids and an OH number of 22 mg KOH/g available as SPECFLEX™ NC-701 Polyol from The Dow Chemical Company;

"Polyol-4" is a nominal 4800 Mw EO-capped trio with an OH number of 34 mg KOH/g available as VORANOL 4701 Polyol from The Dow Chemical Company;

"Polyol-5" is a nominal 724 Mw 4.5 functional sucrose/glycerine initiated polyether polyol with an OH number of 360 KOH/g available as VORANOL 360 Polyol from the Dow Chemical Company;

"Polyol-6" is a nominal 575 Mw 4 functional aromatic amine initiated polyether polyol with an OH number of 391 KOH/g available as VORANOL 391 Polyol from The Dow Chemical Company;

"SPI 847" is bis (2-diethylamino ethyl) ether tertiary amine catalyst available as from Specialty Products;

"T-403" is a triamine crosslinker prepared by the reaction of PO with a triol initiator, followed by amination of the terminal hydroxyl groups available from Huntsman as JEFFAMINE™ T 403;

"TEGOSTAB™ B 8404" is a polysilicone surfactant used in rigid polyurethane foams available from Evonik Industries/Goldschmidt Chemical Corporation;

"Odor" is an amine neutralizer to reduce odor;

"MDI" is a 3.2 functional polymeric MDI with 30.4% NCO and an isocyanate equivalent weight of 138 available as PAPI™ 20 Isocyanate from The Dow Chemical Company;

"DINP" is diisononyl phthalate;

"TEGOSTAB B 8870" is a polysilicone surfactant used in rigid polyurethane foams available from Evonik Industries/Goldschmidt Chemical Corporation;

"DABCO DC-198" is high-efficiency silicone glycol copolymer surfactant available from Air Products.

Water adsorption is determined as follows:

1. Prepare 100 mm square by 300 mm long box section from e-coated metal panels.
2. Fill panels with 100-150 g foam, allow for 24 hr cure at room temperature.
3. Determine weight of foam less metal and record.
4. Expose assembly to 38 C, 100% RH for 10 days.
5. Remove and condition at 23 C, 50% RH for 24 hr and determine weight of foam.

Water Adsorption=(Foam weight wet−Foam weight dry)/Foam weight dry)×100

Material stability is determined according to Dimensional Stability, ASTM D2126 under these conditions (any direction, average of 3 test samples):

| | | |
|---|---|---|
| 3.4.4.1 | 20 minutes @ 121 +/− 2° C. | 10.0% |
| 3.4.4.2 | 7 days at 102 +/− 2° C. | 5.0% |
| 3.4.4.3 | 7 days at −15° C. | 5.0% |

The foam cubes measuring 2×2×2 inches, the length, width and height of each cube is pre-measured prior to condition exposure (V1). The cubes are re-measured after exposure (V2). Calculate volume changes.

% change=[(V1−V2)/V1]×100

Viscosity is determined according to ASTM D445 test method.

TABLE 1

| | Comparative Example | | | | |
|---|---|---|---|---|---|
| Example | A | B | 1 | 2 | 3 |
| A-Side | | | | | |
| MDI | 74 | 74 | 74 | 74 | 69 |
| DINP | 25 | 25 | 25 | 25 | 30 |
| TEGOSTAB B 8870 | 0.65 | 0.65 | 0.65 | 0.65 | 0.65 |
| DABCO DC-198 | 0.35 | 0.35 | 0.35 | 0.35 | 0.35 |
| Total | 100 | 100 | 100 | 100 | 100 |
| B-Side | | | | | |
| Polyol-1 | 35 | | | | |
| Polyol-2 | | | | | |
| Polyol-3 | | 41 | 31 | 28 | 28 |
| Polyol-4 | 42 | 30 | 34 | 32 | 32 |
| Polyol-5 | 7 | | | | |
| Polyol-6 | | 13 | 20 | 20 | 20 |
| SPI 847 | 6 | 6 | 5 | 5 | 5 |
| T-403 | | | | 5 | 5 |
| TEGOSTAB B 8404 | 1 | 1 | 1 | 1 | 1 |
| Odor | 0.05 | 0.05 | 0.05 | 0.05 | 0.05 |
| Water | 8.95 | 8.95 | 8.95 | 8.95 | 8.95 |
| Total | 100 | 100 | 100 | | |
| PROCESS | | | | | |
| A-Side: B-Side ratio, by vol | 2:1 | 2:1 | 2:1 | 2:1 | 2:1 |
| PROPERTIES | | | | | |
| Water absorption, % | 22.23 | 24.63 | 5.19 | 2 | |
| Material Stability | Stable | Stable | Stable | Stable | Stable |
| Viscosity, cps at ambient 23° C. | 700 | 1325 | 1400 | 1400 | |

What is claimed is:

1. A process to form a semi-rigid polyurethane foam, comprising the reaction product of:
   a) an A-side comprising
      i) 65 to 85 wt % of a polymeric MDI blend,
      ii) 10 to 35 wt % of a plasticizer, and
      iii) 0.2 to 1.5 wt % of a first A-side surfactant,
      wherein the A-side weight percents are based on the total weight of the A-side,
   b) a B-side comprising:
      i) 10 to 40 wt % of a copolymer polyol containing at least 40% solids,
      ii) 10 to 40 wt % of a polyether polyol having a functionality equal to or greater than 3 and equal to and less than 8, wherein said polyether polyol has a viscosity at 25° C. of at least about 500 cP, as measured according to ASTM D455, and wherein said polyether polyol has an average molecular weight of from 100 to 10,000,
      iii) 10 to 25 wt % of an autocatalytic aromatic polyol,
      iv) 1 to 10 wt % of a tertiary amine catalyst,
      v) 0.5 to 2 wt % of a first B-side surfactant, and
      vi) 5 to 15 wt % water,
      wherein the B-side weight percents are based on the total weight of the B-side, said process comprising the steps of:
   A) forming a reactive blend by mixing said A-side and said B-side at 130° F. or less in a ratio, (A-side):(B-side), of 1:1 to 5:1 by volume; and
   B) subjecting the resulting reactive blend to conditions sufficient to cure the reactive blend to form a semi-rigid polyurethane foam,
   wherein said semi-rigid polyurethane foam fails to resist permanent deformation after repeated compression in excess of 50%.

2. The process of claim 1 wherein the B-side further comprises:
   vii) 2 to 6 wt % of a crosslinker.

3. The process of claim 1 wherein the polymeric MDI blend a) i) has an NCO range of 18 to 25%.

4. The process of claim 1 wherein the first A-side surfactant a) iii) is an organosilicone.

5. The process of claim 4 further comprising a)iv) 0.2 to 1.5 wt % of a second A-side surfactant different from the first A-side surfactant, wherein the said second A-side surfactant is an organosilicone.

6. The process of claim 1 wherein the semi-rigid polyurethane foam is used in an automobile noise and vibration-absorbing application.

* * * * *